(12) United States Patent
Liu

(10) Patent No.: US 11,375,504 B2
(45) Date of Patent: Jun. 28, 2022

(54) METHOD FOR INDICATING TIME-DOMAIN INFORMATION OF COMMON CONTROL RESOURCE SET OF REMAINING MINIMUM SYSTEM INFORMATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 95 days.

(21) Appl. No.: 16/872,340

(22) Filed: May 11, 2020

(65) Prior Publication Data

US 2020/0275445 A1 Aug. 27, 2020

Related U.S. Application Data

(63) Continuation of application No. PCT/CN2017/111284, filed on Nov. 16, 2017.

(51) Int. Cl.
*H04W 72/04* (2009.01)
*H04W 56/00* (2009.01)
*H04W 72/12* (2009.01)

(52) U.S. Cl.
CPC ... *H04W 72/0446* (2013.01); *H04W 56/0015* (2013.01); *H04W 72/1205* (2013.01)

(58) Field of Classification Search
CPC ......... H04W 72/0446; H04W 56/0015; H04W 72/1205; H04W 48/12; H04L 5/00; H04L 5/0053

See application file for complete search history.

(56) References Cited

U.S. PATENT DOCUMENTS

| 10,728,916 B2 | 7/2020 | Ly et al. |
| 2010/0124919 A1 | 5/2010 | Ko |
| 2013/0275400 A1 | 10/2013 | Rus |
| 2015/0103715 A1 | 4/2015 | Chen et al. |
| 2015/0103777 A1 | 4/2015 | Chen et al. |

(Continued)

FOREIGN PATENT DOCUMENTS

| CN | 101300802 A | 11/2008 |
| CN | 101395830 A | 3/2009 |

(Continued)

OTHER PUBLICATIONS

First Office Action of the Chinese application No. 201780001948.0, dated Nov. 4, 2020.

(Continued)

*Primary Examiner* — Gregory B Sefcheck
*Assistant Examiner* — Joshua Smith
(74) *Attorney, Agent, or Firm* — Syncoda LLC; Feng Ma

(57) ABSTRACT

A method for indicating time-domain information of a control resource set (CORESET) of remaining minimum system information (RMSI) includes: adding indication information to a physical broadcast channel (PBCH) of a synchronization signal block (SSB), the indication information comprising at least one of the following: both first indication information and second indication information, third indication information, or fourth indication information; and sending, by means of beam scanning, to user equipment (UE) the SSB carrying the indication information.

16 Claims, 11 Drawing Sheets

(56) References Cited

U.S. PATENT DOCUMENTS

| | | | |
|---|---|---|---|
| 2015/0201249 A1 | 7/2015 | Ryu et al. | |
| 2017/0339683 A1 | 11/2017 | Chen et al. | |
| 2018/0049203 A1* | 2/2018 | Xue | H04W 72/042 |
| 2018/0098361 A1* | 4/2018 | Ji | H04L 5/0092 |
| 2019/0053293 A1* | 2/2019 | Akoum | H04W 24/10 |
| 2019/0089474 A1 | 3/2019 | Ly et al. | |
| 2019/0123992 A1 | 4/2019 | Ly et al. | |
| 2019/0159264 A1* | 5/2019 | Zhang | H04W 16/28 |
| 2020/0045672 A1 | 2/2020 | Yang | |
| 2020/0059911 A1* | 2/2020 | Tang | H04L 5/0053 |
| 2020/0162217 A1 | 5/2020 | Liu et al. | |
| 2020/0178253 A1 | 6/2020 | Gao et al. | |
| 2020/0220691 A1* | 7/2020 | Gao | H04L 5/0053 |
| 2020/0228275 A1 | 7/2020 | Li et al. | |
| 2020/0296656 A1 | 9/2020 | Amuru et al. | |
| 2020/0314776 A1 | 10/2020 | Harada et al. | |
| 2020/0344097 A1 | 10/2020 | Si et al. | |

FOREIGN PATENT DOCUMENTS

| | | | |
|---|---|---|---|
| CN | 101453243 A | 6/2009 | |
| CN | 102007808 A | 4/2011 | |
| CN | 101578902 B | 6/2012 | |
| CN | 103931254 A | 7/2014 | |
| CN | 105612801 A | 5/2016 | |
| CN | 106851840 A | 6/2017 | |
| CN | 107278383 A | 10/2017 | |
| EP | 2787671 A1 | 10/2014 | |
| EP | 3694283 A1 | 8/2020 | |
| RU | 2428815 C2 | 9/2011 | |
| RU | 2602808 C1 | 11/2016 | |
| WO | 2014162568 A1 | 10/2014 | |
| WO | 2017052458 A1 | 3/2017 | |

OTHER PUBLICATIONS

International Search Report in the international application No. PCT/CN2017/111284, dated Aug. 13, 2018.
CATT. "Offline Summary for AI 7.1.2.2 Remaining Details on Remaining Minimum System Information" 3GPP TSG RAN WG1 Meeting 90bis R1-1719145, Oct. 13, 2017(Oct. 13, 2017), sections 2.3, 2.6, and 5.
VIVO. "Remaining Aspects on NR-PBCH Contents And Payload" 3GPP TSG RAN WG1 Meeting #90bis R1-1717460, Oct. 13, 2017 (Oct. 13, 2017), pp. 1-7.
NTT DOCOMO, Inc. "Discussion on Remaining Details on NR-PBCH and PBCH-DMRS" 3GPP TSG RAN WG1 Meeting NR#3 R1-1716070, Sep. 21, 2017(Sep. 21, 2017), pp. 1-15.
English translation of the Written Opinion of the International Search Authority in the international application No. PCT/CN2017/111284, dated Aug. 13, 2018.
3Rd Generation Partnership Project; Technical Specification Group Radio Access Network; Study on New Radio (NR) to support Non Terrestrial Networks (Release 15); 3GPP TR 38.811V0.1.0 (Jun. 2017).
Qualcomm Incorporated. Remaining System Information Delivery Consideration. 3GPP TSG RAN WG1 Meeting 90bis, R1-1718528. Oct. 13, 2017 (Oct. 13, 2017), sections 2.1, 2.2 and 3.
CATT. Offline Summary for AI 7.1. 2.2 Remaining Details on Remaining Minimum System Information. 3GPP TSG RAN WG1 Meeting 90bis, R1-1718772. Oct. 13, 2017 (Oct. 13, 2017), sections 2.2 and 2.6.2.
LG Electronics. Discussion on Search Space Design. 3GPP TSG RAN WG1 Meeting 90bis, R1-1717952. Oct. 13, 2017 (Oct. 13, 2017), entire document.
Intel Corporation. "Details on NR PBCH design", 3GPP TSG RAN WG1 Meeting RAN1#89, R1-1707339, May 19, 2017 (May 19, 2017), p. 1-4.
International Search Report in the international application No. PCT/CN2017/110927, dated Aug. 7, 2018.
Written Opinion of the International Search Authority in the international application No. PCT/CN2017/110927, dated Aug. 7, 2018.
First Office Action of the Chinese application No. 201780001912.2, dated Mar. 13, 2019.
First Office Action of the Russian application No. 2020118936, dated Sep. 30, 2020.
Notice of Allowance of the Russian application No. 2020118936, dated Dec. 3, 2020.
3GPP TSG-RAN WG1 NR AH#3 R1-1716524, Nagoya, Japan, Sep. 18-21, 2017, Agenda item: 6.1.2.1; Source: Nokia, Nokia Shanghai Bell; Title: Remaining details on NR-PBCH.
3GPP TSG RAN WG1 Meeting 90bis R1-1718181, Prague, CZ, Oct. 9-13, 2017, Source: NTT DOCOMO, Inc.; Title: Discussion on remaining details on RMSI delivery.
3GPP TSG RAN WG1 Meeting NR#3 R1-1715378, Nagoya, Japan, Sep. 18-21, 2017, Source: ZTE, Sanechips; Title: Remaining details of RMSI.
Supplementary European Search Report in the European application No. 17932074.2, dated May 3, 2021.
First Office Action of the Japanese application No. 2020-543663, dated Jun. 15, 2021.
First Office Action of the Korean application No. 10-2020-7016675, dated Sep. 20, 2021.
First Office Action of the U.S. Appl. No. 16/862,544, dated Aug. 11, 2021.
Huawei et al. NR-PBCH Contents and Payload Size. 3GPP TSG RAN WG1 Meeting #90, R1-1712143. Aug. 25, 2017 (Aug. 25, 2017), p. 4, line 1 to p. 5, line 10.
Nokia et al. Remaining Details on NR-PBCH. 3GPP TSG-RAN WG1 Meeting 90bis. R1-1718612. Oct. 13, 2017 (Oct. 13, 2017), entire document.
VIVO. Remaining Aspects on NR-PBCH Contents and Payload. 3GPP TSG RAN WG1 NR Ad-Hoc#3. R1-1715607. Sep. 21, 2017 (Sep. 21, 2017), entire document.
NTT DOCOMO et al. Draft LS on NR Initial Access and Mobility. 3GPP TSG RAN WG Meeting #90 R1-1715259. Aug. 25, 2017 (Aug. 25, 2017), entire document.
Written Opinion of the International Search Authority in the international application No. PCT/CN2017/111084, dated Aug. 3, 2018.
International Search Report in the international application No. PCT/CN2017/111084, dated Aug. 3, 2018.
CATT, "Remaining details on RMSI", 3GPP TSG RAN WG1 Meeting 90bis R1-1717799, Prague, CZ, Oct. 9-13, 2017.
First Office Action of the Chinese application No. 201780001841.6, dated Apr. 14, 2021.
MCC Support: "Final Report of 3GPP TSG RAN WG1 #AH_NR3 V1.0.0", 3GPP Draft; Final Minutes Report RAN1 #AH NR3 V100, 3rd Generation Partnership Project (3GPP), Mobile Competence Centre; 650, Route Des Lucioles; F-06921 Sophia-Antipolis Cedex; France vol. RAN WG1, No. Prague, Czech Rep; Oct. 9, 2017-Oct. 13, 2017, XP051354030, the whole document.
MCC Support: "Final Report of 3GPP TSG RAN WG1 #AH_NR2 V1.0.0", 3GPP Draft; Final Minutes Report RAN1 #AH NR2 V100, 3rd Generation Partnership Project (3GPP), Mobile Competence Centre; 650, Route Des Lucioles; F-06921 Sophia-Antipolis Cedex; France vol. RAN WG1, No. Prague, Czech Rep; Aug. 21, 2017-2017082520, XP051328123, the whole document.
NTT DOCOMO et al: "Discussion on remaining details on NR-PBCH and PBCH-DMRS", 3GPP Draft: R1-1718180 Remaining Details on NR-PBCH Final, 3rd Generation Partnership Project (3GPP), Mobile Competence Centre: 650, Route DesLucioles: F-06921 Sophia-Anti Polis Cedex France vol. RAN WG1, No. Prague, CZ; Oct. 9, 2017-Oct. 13, 2017, XP051352888, the whole document.
Qualcomm Incorporated: "Remaining details on NR-PBCH", 3GPP Draft; R1-1716379 Remaining Details on NR-PBCH, 3rd Generation Partnership Project (3GPP), Mobile Competence Centre: 650, Route Des Lucioles; F-06921Sophia-Antipolis Cedex Francevol. RAN WG1, No. Nagoya, Japan; Sep. 18, 2017-Sep. 21, 2017, XP051329968, the whole document.
Supplementary European Search Report in the European application No. 17932403.3, dated Jun. 21, 2021.
Office Action of the Indian application No. 202047024595, dated Aug. 5, 2021.

(56) References Cited

OTHER PUBLICATIONS

First Office Action of the U.S. Appl. No. 16/762,657, dated Sep. 28, 2021.
Final Office Action of the U.S. Appl. No. 16/762,657, dated Mar. 8, 2022.

* cited by examiner

METHOD FOR INDICATING TIME-DOMAIN INFORMATION OF COMMON CONTROL RESOURCE SET OF REMAINING MINIMUM SYSTEM INFORMATION

CROSS-REFERENCE TO RELATED APPLICATION

The present application is a continuation of International Patent Application No. PCT/CN2017/111284 filed on Nov. 16, 2017, the disclosure of which is hereby incorporated by reference in its entirety.

BACKGROUND

In recent discussions of the 3rd generation partnership project (3GPP), it is proposed that how to indicate time scheduling information of a CORESET of RMSI in a physical broadcast channel (PBCH) is an important problem that needs to be solved. The time scheduling information includes a starting position, an offset, a window size, a scheduling unit and the like. Since such information has been determined to be borne in the PBCH and at most 8 bits can be reserved for time-frequency indication information and cycle indication information of the CORESET of the RMSI in the PBCH only, 1 bit being probably reserved, and frequency-domain indication information and the cycle indication information requiring at least 4 bits, therefore only 3 to 4 bits are reserved for time-domain scheduling information. In addition, considering time-domain merging of PBCHs, it is required that contents of PBCH of synchronization signal blocks (SSBs) corresponding to each beam are consistent, which further restricts an indication method. Moreover, the CORESET of the RMSI may also be scheduled in both manners of slot-based and non-slot-based, which further increases difficulties in indication.

SUMMARY

The present disclosure relates generally to the technical field of communication, and more specifically to a method and device for indicating time-domain information of a common control resource set (CORESET) of remaining minimum system information (RMSI), a method and device for searching a CORESET of RMSI, a base station and a user equipment (UE).

According to a first aspect of embodiments of the present disclosure, a method for indicating time-domain information indication of a CORESET of RMSI is provided, which may be applied to a base station and include that:

adding indication information into a PBCH of a synchronization signal block (SSB);

wherein the indication information includes at least one of the following:

both first indication information and second indication information;

third indication information; or fourth indication information, wherein the first indication information indicates a time sequence of a CORESET of RMSI corresponding to the SSB and the SSB, and the second indication information indicates time offset information of the CORESET of the RMSI relative to the SSB in each cycle;

wherein in response to the CORESET of the RMSI and the SSB are within different half frames of a same cycle, the time offset information is time offset information of the CORESET of the RMSI relative to an SSB mapped into a half frame where the CORESET of the RMSI is located;

wherein the third indication information indicates a scheduling manner for the CORESET of the RMSI, and the fourth indication information indicates a size of a detection window for the CORESET of the RMSI; and sending the SSB carrying the indication information to a UE in a manner of beam sweeping.

According to a second aspect of the embodiments of the present disclosure, a method for searching time-domain information of a CORESET of RMSI is provided, which may be applied to a UE and include that:

receiving an SSB carrying indication information sent by a base station;

wherein the indication information includes at least one of the following:

both first indication information and second indication information;

third indication information; or fourth indication information, wherein the first indication information indicates a time sequence of a CORESET of RMSI corresponding to the SSB and the SSB, and the second indication information indicates time offset information of the CORESET of the RMSI relative to the SSB in each cycle;

wherein in response to the CORESET of the RMSI and the SSB are within different half frames of a same cycle, the time offset information is time offset information of the CORESET of the RMSI relative to an SSB mapped into a half frame where the CORESET of the RMSI is located;

wherein the third indication information indicates a scheduling manner for the CORESET of the RMSI, and the fourth indication information indicates a size of a detection window for the CORESET of the RMSI; and parsing out the indication information from the SSB, and searching, according to the indication information, a corresponding time-domain for the CORESET of the RMSI.

According to a third aspect of the embodiments of the present disclosure, a base station is provided, which may include:

a processor; and a memory device configured to store instructions executable for the processor, wherein the processor may be configured to:

add indication information into a PBCH of an SSB;

wherein the indication information includes at least one of the following:

both first indication information and second indication information;

third indication information; or fourth indication information, wherein the first indication information indicates a time sequence of a CORESET of RMSI corresponding to the SSB and the SSB, and the second indication information indicates time offset information of the CORESET of the RMSI relative to the SSB in each cycle;

wherein in response to the CORESET of the RMSI and the SSB are within different half frames of a same cycle, the time offset information is time offset information of the CORESET of the RMSI relative to an SSB mapped into a half frame where the CORESET of the RMSI is located;

wherein the third indication information indicates a scheduling manner for the CORESET of the RMSI, and the fourth indication information indicates a size of a detection window for the CORESET of the RMSI; and send the SSB carrying the indication information to a UE in a manner of beam sweeping.

According to a fourth aspect of the embodiments of the present disclosure, a UE is provided, which may include:

a processor; and a memory device configured to store instructions executable for the processor, wherein the processor may be configured to:

receive an SSB carrying indication information sent by a base station;

wherein the indication information includes at least one of the following:

both first indication information and second indication information;

third indication information; or fourth indication information, wherein the first indication information indicates a time sequence of a CORESET of RMSI corresponding to the SSB and the SSB, and the second indication information indicates time offset information of the CORESET of the RMSI relative to the SSB in each cycle;

wherein in response to the CORESET of the RMSI and the SSB are within different half frames of a same cycle, the time offset information is time offset information of the CORESET of the RMSI relative to an SSB mapped into a half frame where the CORESET of the RMSI is located;

wherein the third indication information indicates a scheduling manner for the CORESET of the RMSI and the fourth indication information indicates a size of a detection window for the CORESET of the RMSI; and parse out the indication information from the SSB, and search, according to the indication information, a corresponding time-domain for the CORESET of the RMSI.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1A:
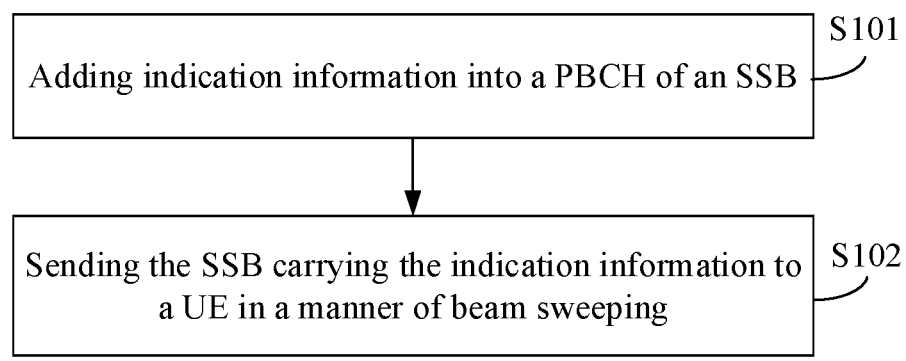
FIG. 1A is a flowchart showing a method for indicating time-domain information of a CORESET of RMSI, according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

FIG. 1A is a flowchart showing a method for indicating time-domain information of a CORESET of RMSI, according to some embodiments of the present disclosure. The embodiment is described from a base station side. As shown in FIG. 1A, the method for indicating the time-domain information of the CORESET of the RMSI includes the following blocks.

In S101, indication information is added into a PBCH of an SSB, the indication information including at least one of both first indication information and second indication information, third indication information, or fourth indication information, the first indication information being configured to indicate a time sequence of a CORESET of RMSI corresponding to the SSB and the SSB, the second indication information being configured to indicate time offset information of the CORESET of the RMSI relative to the SSB in each cycle, the time offset information being equal to time offset information of the CORESET of the RMSI relative to an SSB mapped into a half frame where the CORESET of the RMSI is located if the CORESET of the RMSI and the SSB are within different half frames of the same cycle, the third indication information being configured to indicate a scheduling manner for the CORESET of the RMSI and the fourth indication information being configured to indicate a size of a detection window for the CORESET of the RMSI.

The SSB may be a Synchronization Signal (SS) block and may also be a PBCH block.

In the embodiments, a base station may add the indication information into the PBCH of the SSB, and the indication information can include at least one of both the first indication information and the second indication information, the third indication information, or the fourth indication information. The first indication information and the second indication information form an option, and for convenient description, the first indication information and the second indication information is called a first option. The third indication information is an option, and for convenient description, the third indication information is called a second option. The fourth indication information is an option, and for convenient description, the fourth indication information is called a third option. That is, in the embodiments, the indication information can include any one or more of the first option, the second option and the third option.

The first indication information is configured to indicate the time sequence of the CORESET of the RMSI corresponding to the SSB and the SSB. Since the time sequence of the two includes that the CORESET of the RMSI is before the SSB and the CORESET of the RMSI is after the SSB, the first indication information can be indicated with 1 bit.

The second indication information is configured to indicate the time offset information of the CORESET of the RMSI corresponding to the SSB relative to the SSB in each cycle. If the CORESET of the RMSI and the SSB are within different half frames of the same cycle, the time offset information is equal to the time offset information of the CORESET of the RMSI relative to the SSB mapped into the half frame where the CORESET of the RMSI is located.

In the embodiments, in response to the CORESET of the RMSI and the SSB being within the same half frame and the time sequence of the CORESET of the RMSI and the SSB being that the CORESET of the RMSI is after the SSB, the time offset information of the CORESET of the RMSI relative to the SSB is calculated from a slot in the half frame immediately after the slot where the SSB is located. In response to the CORESET of the RMSI and the SSB being within different half frames of the same cycle and the time sequence of the CORESET of the RMSI and the SSB being that the CORESET of the RMSI is after the SSB, the time offset information of the CORESET of the RMSI relative to the SSB mapped into a half frame where the CORESET of the RMSI is located is calculated from a slot immediately after the slot where the SSB mapped into the half frame where the CORESET of the RMSI is located.

Figure 1B:
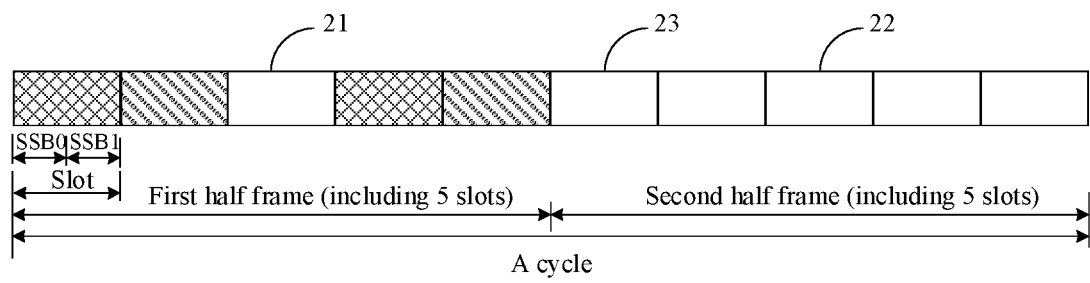
FIG. 1B is a schematic diagram illustrating a position relationship between an SSB and a CORESET of RMSI for corresponding, according to some embodiments of the present disclosure.

As shown in FIG. 1B, if a CORESET0 of RMSI corresponding to an SSB0 is after the SSB0 and the CORESET0 of the RMSI corresponding to the SSB0 is in slot 21, in a first half frame shown in FIG. 1B, the time offset information of the CORESET0 of the RMSI relative to the SSB0 is calculated from a slot in the first half frame immediately after the slot (i.e., slot 1) where the SSB0 is located, namely slot 2 is taken as the calculation starting point, and the time offset information of the CORESET0 of the RMSI corresponding to the SSB0 and the SSB0 is 1 slot. If the CORESET0 of the RMSI corresponding to the SSB0 is in slot 22 and the CORESET0 of the RMSI and the SSB0 are within different half frames of the same cycle, the time offset information of the CORESET0 of the RMSI relative to the SSB0 is calculated from a slot immediately after the slot (i.e., slot 23 in FIG. 1B) where the SSB mapped into the half frame where the CORESET0 of the RMSI is located, and thus it can be calculated that the time offset information of the CORESET0 of the RMSI corresponding to the SSB0 and the SSB0 is 1 slot.

It can be seen from the above descriptions that, no matter whether the CORESET of the RMSI and the SSB are within the same half frame or not, bits for the second indication information will not exceed 2 bits.

Similarly, in response to the CORESET of the RMSI and the SSB being within the same half frame and the time sequence of the CORESET of the RMSI and the SSB being that the CORESET of the RMSI is before the SSB, the time offset information of the CORESET of the RMSI relative to the SSB is calculated from a slot in the half frame immediately before the slot where the SSB is located. In response to the CORESET of the RMSI and the SSB being within different half frames of the same cycle and the time sequence of the CORESET of the RMSI and the SSB being that the CORESET of the RMSI is before the SSB, the time offset information of the CORESET of the RMSI relative to the SSB mapped into the half frame where the CORESET of the RMSI is located is calculated from a slot immediately before the slot where the SSB mapped into the half frame where the CORESET of the RMSI is located.

The third indication information is configured to indicate the scheduling manner for the CORESET of the RMSI, and the scheduling manner for the CORESET of the RMSI can include slot-based scheduling and non-slot-based scheduling, so that the third indication information can be indicated with 1 bit.

In the embodiments, under the condition that there are remaining bits in bits configured to represent the indication information, the indication information may further include the fourth indication information, and the fourth indication information is configured to indicate a size of the detection window for the CORESET of the RMSI.

In S102, the SSB carrying the indication information is sent to the UE in a manner of beam sweeping.

In the embodiments, after the indication information is added into the PBCH of the SSB, the SSB carrying the indication information may be sent to the UE in the manner of beam sweeping.

According to the embodiments, the indication information is added into the PBCH of the SSB, the indication information including at least one of both the first indication information and the second indication information, the third indication information, or the fourth indication information. In response to the CORESET of the RMSI and the SSB being within different half frames of the same cycle, the time offset information thereof is equal to the time offset information of the CORESET of the RMSI relative to the SSB mapped into the half frame where the CORESET of the RMSI is located, so that the second indication information can be indicated with as few bits as possible, and at most 1 bit is used for other indication information. Therefore, the time-domain information of the CORESET of the RMSI can be indicated with as few bits as possible.

Figure 2:
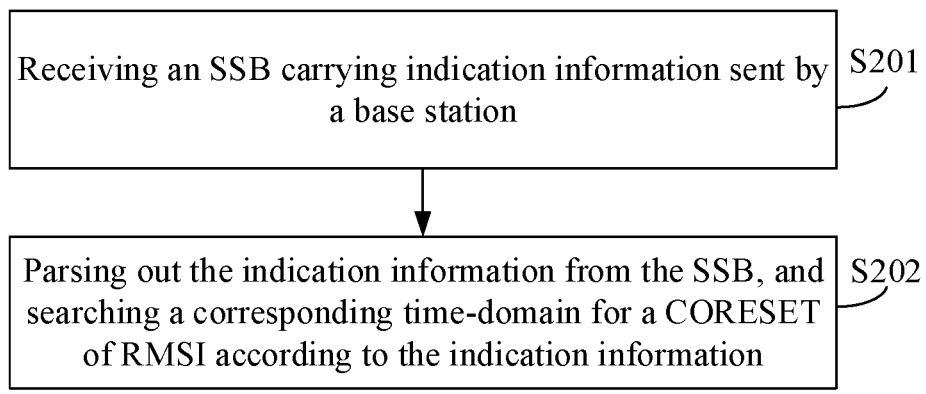
FIG. 2 is a flowchart showing a method for searching a CORESET of RMSI, according to some embodiments of the present disclosure.

FIG. 2 is a flowchart showing a method for searching a CORESET of RMSI, according to some embodiments of the present disclosure. The embodiment is described from a UE side. As shown in FIG. 2, the method for searching the CORESET of the RMSI includes the following blocks.

In S201, an SSB carrying indication information is received from a base station, the indication information including at least one of both first indication information and second indication information, third indication information, or fourth indication information, the first indication information being configured to indicate a time sequence of a CORESET of RMSI corresponding to the SSB and the SSB, the second indication information being configured to indicate time offset information of the CORESET of the RMSI relative to the SSB in each cycle, the time offset information being equal to time offset information of the CORESET of the RMSI relative to an SSB mapped into a half frame where the CORESET of the RMSI is located if the CORESET of the RMSI and the SSB are within different half frames of the same cycle, the third indication information being configured to indicate a scheduling manner for the CORESET of the RMSI and the fourth indication information being configured to indicate a size of a detection window for the CORESET of the RMSI.

In S202, the indication information is parsed out from the SSB, and a corresponding time-domain is searched for the CORESET of the RMSI according to the indication information.

In the embodiments, in response to the indication information including the first indication information and the second indication information, the operation that the corresponding time-domain is searched for the CORESET of the RMSI according to the indication information may include any one of the following situations.

Situation one: if the CORESET of the RMSI and the SSB to be received are within the same half frame and the time sequence is that the CORESET of the RMSI is after the SSB, the CORESET of the RMSI is searched in a slot which number corresponding to the time offset information after a next slot, taken as a starting point, of a slot where the SSB is located in the corresponding half frame.

Situation two: if the CORESET of the RMSI and the SSB to be received are within the same half frame and the time sequence is that the CORESET of the RMSI is before the SSB, the CORESET of the RMSI is searched in a slot which number corresponding to the time offset information before a previous slot, taken as the starting point, of the slot where the SSB is located in the corresponding half frame.

Situation three: if the CORESET of the RMSI and the SSB to be received are within different half frames and the time sequence is that the CORESET of the RMSI is after the SSB, the CORESET of the RMSI is searched in a slot which number corresponding to the time offset information after a next slot, taken as the starting point, of a slot where the SSB mapped into the half frame where the CORESET of the RMSI is located.

Situation four: if the CORESET of the RMSI and the SSB to be received are within different half frames and the time sequence is that the CORESET of the RMSI is before the SSB, the CORESET of the RMSI is searched in a slot which number corresponding to the time offset information before a previous slot, taken as the starting point, of the slot where the SSB mapped into the half frame where the CORESET of the RMSI is located.

In the embodiments, in response to the indication information including the third indication information, the operation that the corresponding time-domain is searched for the CORESET of the RMSI according to the indication information may include that the CORESET of the RMSI is searched for according to a time-domain scheduling unit indicated by the third indication information.

In the embodiments, in response to the indication information including the fourth indication information, the operation that the corresponding time-domain is searched for the CORESET of the RMSI according to the indication information may include that a corresponding detection window is searched for the CORESET of the RMSI according to the fourth indication information.

According to the embodiments, the SSB carrying the indication information is received from the base station, and the corresponding time-domain is searched for the CORESET of the RMSI according to the indication information parsed out from the SSB. In the whole implementation process, few bits are occupied by the time-domain information of the CORESET of the RMSI, and searching efficiency of the CORESET of the RMSI is improved.

Figure 3:
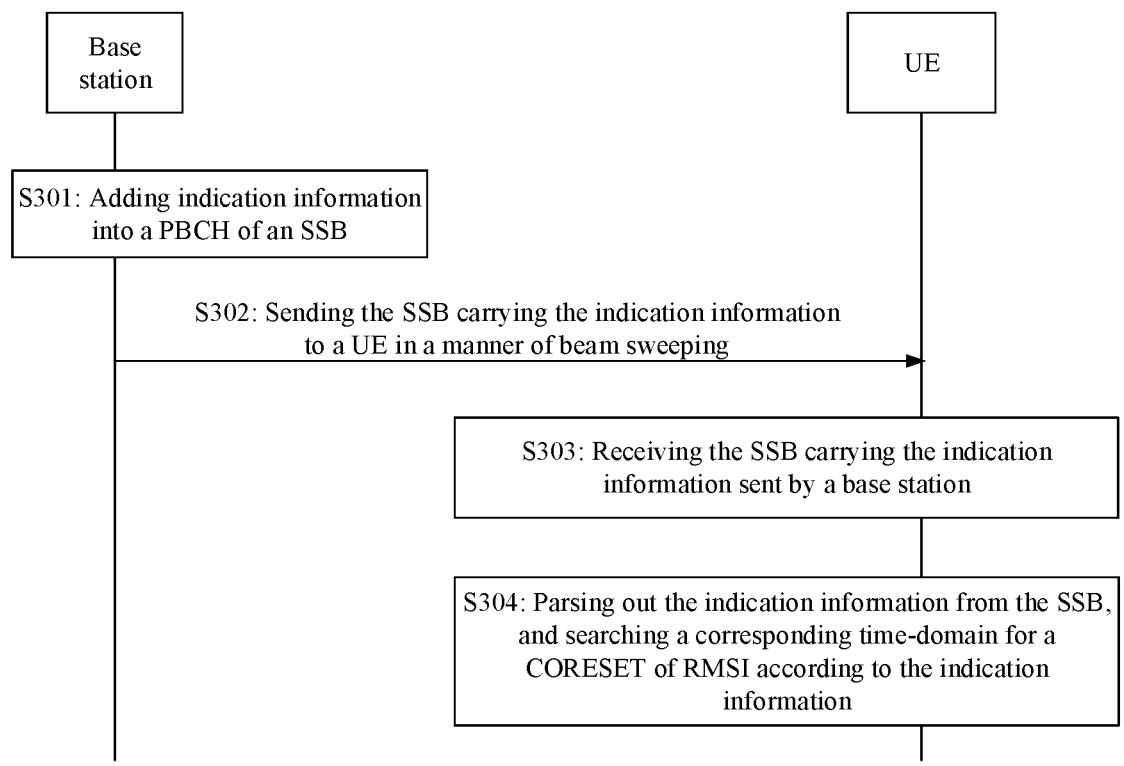
FIG. 3 is a signaling flowchart showing a method for searching a CORESET of RMSI, according to some embodiments of the present disclosure.

FIG. 3 is a signaling flowchart showing a method for searching a CORESET of RMSI, according to some embodiments of the present disclosure. The embodiment is described from the angle of interaction between a base station and a UE. As shown in FIG. 3, the method includes the following blocks.

In S301, the base station adds indication information into a PBCH of an SSB.

The indication information may include first indication information, second indication information, third indication information and fourth indication information.

In S302, the base station sends the SSB carrying the indication information to the UE in a manner of beam sweeping.

In S303, the UE receives the SSB carrying the indication information sent by the base station.

In S304, the UE parses out the indication information from the SSB and searches a corresponding time-domain for the CORESET of the RMSI according to the indication information.

A process that the UE searches the corresponding time-domain for the CORESET of the RMSI according to the indication information is the same as a searching process in the embodiments shown in FIG. 2 and will not be elaborated herein.

According to the embodiments, through the interaction between the base station and the UE, the time-domain information of the CORESET of the RMSI can be indicated with as few bits as possible, and the CORESET of the RMSI can be searched according to the indication information with searching efficiency.

Figure 4:
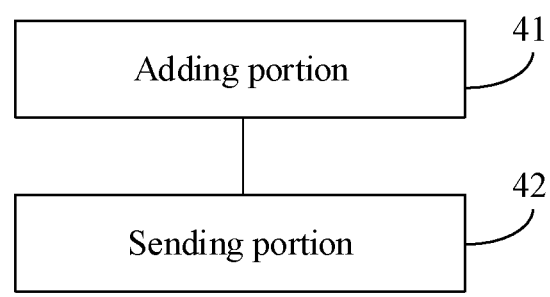
FIG. 4 is a block diagram of a device for indicating time-domain information of a CORESET of RMSI, according to some embodiments of the present disclosure.

FIG. 4 is a block diagram of a device for indicating time-domain information of a CORESET of RMSI, according to some embodiments of the present disclosure. The device may be in a base station. As shown in FIG. 4, the device includes an adding portion 41 and a sending portion 42.

The adding portion 41 is configured to add indication information into a PBCH of an SSB, the indication information including at least one of both first indication information and second indication information, third indication information, or fourth indication information, the first indication information being configured to indicate a time sequence of a CORESET of RMSI corresponding to the SSB and the SSB, the second indication information being configured to indicate time offset information of the CORESET of the RMSI relative to the SSB in each cycle, the time offset information being equal to time offset information of the CORESET of the RMSI relative to an SSB mapped into a half frame where the CORESET of the RMSI is located if the CORESET of the RMSI and the SSB are within different half frames of the same cycle, the third indication information being configured to indicate a scheduling manner for the CORESET of the RMSI and the fourth indication information being configured to indicate a size of a detection window for the CORESET of the RMSI.

In the embodiments, the base station may add the indication information into the PBCH of the SSB, and the indication information can include at least one of both the first indication information and the second indication information, the third indication information, or the fourth indication information. The first indication information and the second indication information form an option, and for convenient description, the first indication information and the second indication information is called a first option. The third indication information is an option, and for convenient description, the third indication information is called a second option. The fourth indication information is an option, and for convenient description, the fourth indication information is called a third option. That is, in the embodiments, the indication information can include any one or more of the first option, the second option and the third option.

The first indication information is configured to indicate the time sequence of the CORESET of the RMSI corresponding to the SSB and the SSB. Since the time sequence of the two includes that the CORESET of the RMSI is before the SSB and the CORESET of the RMSI is after the SSB, the first indication information can be indicated with 1 bit.

The second indication information is configured to indicate the time offset information of the CORESET of the RMSI corresponding to the SSB relative to the SSB in each cycle. If the CORESET of the RMSI and the SSB are within different half frames of the same cycle, the time offset information is equal to the time offset information of the CORESET of the RMSI relative to the SSB mapped into the half frame where the CORESET of the RMSI is located.

In the embodiments, in response to the CORESET of the RMSI and the SSB being within the same half frame and the time sequence of the CORESET of the RMSI and the SSB being that the CORESET of the RMSI is after the SSB, the time offset information of the CORESET of the RMSI relative to the SSB is calculated from a slot in the half frame immediately after the slot where the SSB is located. In response to the CORESET of the RMSI and the SSB being within different half frames of the same cycle and the time sequence of the CORESET of the RMSI and the SSB being that the CORESET of the RMSI is after the SSB, the time offset information of the CORESET of the RMSI relative to the SSB mapped into a half frame where the CORESET of the RMSI is located is calculated from a slot immediately after the slot where the SSB mapped into the half frame where the CORESET of the RMSI is located.

As shown in FIG. 1B, if a CORESET0 of RMSI corresponding to an SSB0 is after the SSB0 and the CORESET0 of the RMSI corresponding to the SSB0 is in slot 21, in a first half frame shown in FIG. 1B, the time offset information of the CORESET0 of the RMSI relative to the SSB0 is calculated from a slot in the first half frame immediately after the slot (i.e., slot 1) where the SSB0 is located, namely slot 2 is taken as the calculation starting point, and the time offset information of the CORESET0 of the RMSI corresponding to the SSB0 and the SSB0 is 1 slot. If the CORESET0 of the RMSI corresponding to the SSB0 is in slot 22 and the CORESET0 of the RMSI and the SSB0 are within different half frames of the same cycle, the time offset information of the CORESET0 of the RMSI relative to the SSB0 is calculated from a slot immediately after the slot (i.e., slot 23 in FIG. 1B) where the SSB mapped into the half frame where the CORESET0 of the RMSI is located, and thus it can be calculated that the time offset information of the CORESET0 of the RMSI corresponding to the SSB0 and the SSB0 is 1 slot.

It can be seen from the above descriptions that, no matter whether the CORESET of the RMSI and the SSB are within the same half frame or not, bits for the second indication information will not exceed 2 bits.

Similarly, in response to the CORESET of the RMSI and the SSB being within the same half frame and the time sequence of the CORESET of the RMSI and the SSB being that the CORESET of the RMSI is before the SSB, the time offset information of the CORESET of the RMSI relative to the SSB is calculated from a slot in the half frame immediately before the slot where the SSB is located. In response to the CORESET of the RMSI and the SSB being within different half frames of the same cycle and the time sequence of the CORESET of the RMSI and the SSB being that the CORESET of the RMSI is before the SSB, the time offset information of the CORESET of the RMSI relative to the SSB mapped into the half frame where the CORESET of the RMSI is located is calculated from a slot immediately before the slot where the SSB mapped into the half frame where the CORESET of the RMSI is located.

The third indication information is configured to indicate the scheduling manner for the CORESET of the RMSI, and the scheduling manner for the CORESET of the RMSI can include slot-based scheduling and non-slot-based scheduling, so that the third indication information can be indicated with 1 bit.

In the embodiments, under the condition that there are remaining bits in bits configured to represent the indication information, the indication information may further include the fourth indication information, and the fourth indication information is configured to indicate a size of the detection window for the CORESET of the RMSI.

The sending portion 42 is configured to send the SSB carrying the indication information added by the adding portion 41 to the UE in a manner of beam sweeping.

In the embodiments, after the indication information is added into the PBCH of the SSB, the SSB carrying the indication information may be sent to the UE in the manner of beam sweeping.

According to the embodiments, the indication information is added into the PBCH of the SSB, the indication information including at least one of both the first indication information and the second indication information, the third indication information, or the fourth indication information. In response to the CORESET of the RMSI and the SSB being within different half frames of the same cycle, the time offset information thereof is equal to the time offset information of the CORESET of the RMSI relative to the SSB mapped into the half frame where the CORESET of the RMSI is located, so that the second indication information can be indicated with as few bits as possible, and at most 1 bit is used for other indication information. Therefore, the time-domain information of the CORESET of the RMSI can be indicated with as few bits as possible.

Figure 5:
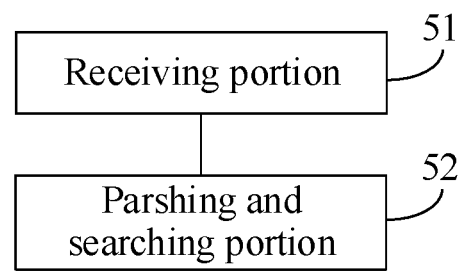
FIG. 5 is a block diagram of a device for searching a CORESET of RMSI, according to some embodiments of the present disclosure.

FIG. 5 is a block diagram of a device for searching a CORESET of RMSI, according to some embodiments of the present disclosure. The device may be in a UE. As shown in FIG. 5, the device includes a receiving portion 51 and a parsing and searching portion 52.

The receiving portion 51 is configured to receive an SSB carrying indication information from a base station, the indication information including at least one of both first indication information and second indication information, third indication information, or fourth indication information, the first indication information being configured to indicate a time sequence of a CORESET of RMSI corresponding to the SSB and the SSB, the second indication information being configured to indicate time offset information of the CORESET of the RMSI relative to the SSB in each cycle, the time offset information being equal to time offset information of the CORESET of the RMSI relative to an SSB mapped into a half frame where the CORESET of the RMSI is located if the CORESET of the RMSI and the SSB are within different half frames of the same cycle, the third indication information being configured to indicate a scheduling manner for the CORESET of the RMSI and the fourth indication information being configured to indicate a size of a detection window for the CORESET of the RMSI.

The parsing and searching portion 52 is configured to parse out the indication information from the SSB received by the receiving portion 51 and search a corresponding time-domain for the CORESET of the RMSI according to the indication information.

According to the embodiments, the SSB carrying the indication information is received from the base station, and the corresponding time-domain is searched for the CORESET of the RMSI according to the indication information parsed out from the SSB. In the whole implementation process, few bits are occupied by the time-domain information of the CORESET of the RMSI, and searching efficiency of the CORESET of the RMSI is improved.

Figure 6:
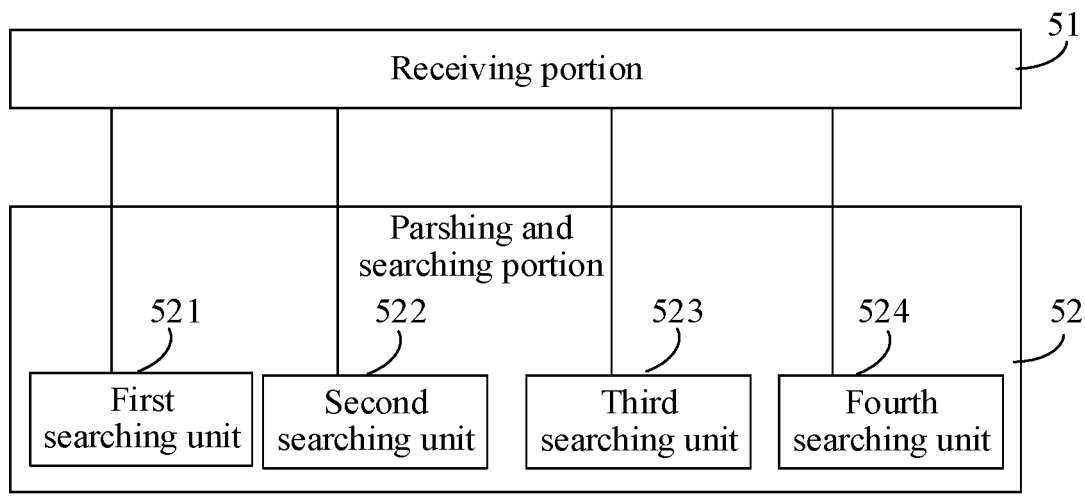
FIG. 6 is a block diagram of another device for searching a CORESET of RMSI, according to some embodiments of the present disclosure.

FIG. 6 is a block diagram of another device for searching a CORESET of RMSI, according to some embodiments of the present disclosure. As shown in FIG. 6, based on the embodiments shown in FIG. 5, in response to the indication information including the first indication information and the second indication information, the parsing and searching portion 52 may include a first searching unit 521, a second searching unit 522, a third searching unit 523 or a fourth searching unit 524.

The first searching unit 521 is configured to, if the CORESET of the RMSI and the SSB to be received are within the same half frame and the time sequence is that the CORESET of the RMSI is after the SSB, the CORESET of the RMSI is searched in a slot which number corresponding to the time offset information after a next slot, taken as a starting point, of a slot where the SSB is located in the corresponding half frame.

The second searching unit 522 is configured to, if the CORESET of the RMSI and the SSB to be received are within the same half frame and the time sequence is that the CORESET of the RMSI is before the SSB, the CORESET of the RMSI is searched in a slot which number corresponding to the time offset information before a previous slot, taken as the starting point, of the slot where the SSB is located in the corresponding half frame.

The third searching unit 523 is configured to, if the CORESET of the RMSI and the SSB to be received are within different half frames and the time sequence is that the CORESET of the RMSI is after the SSB, the CORESET of the RMSI is searched in a slot which number corresponding to the time offset information after a next slot, taken as the starting point, of a slot where the SSB mapped into the half frame where the CORESET of the RMSI is located.

The fourth searching unit 524 is configured to, if the CORESET of the RMSI and the SSB to be received are within different half frames and the time sequence is that the CORESET of the RMSI is before the SSB, the CORESET of the RMSI is searched in a slot which number corresponding to the time offset information before a previous slot, taken as the starting point, of the slot where the SSB mapped into the half frame where the CORESET of the RMSI is located.

According to the embodiments, the corresponding slot is searched for the CORESET of the RMSI according to whether the CORESET of the RMSI and the SSB are within the same half frame or not and the time sequence thereof, so that the searching efficiency is high.

Figure 7:
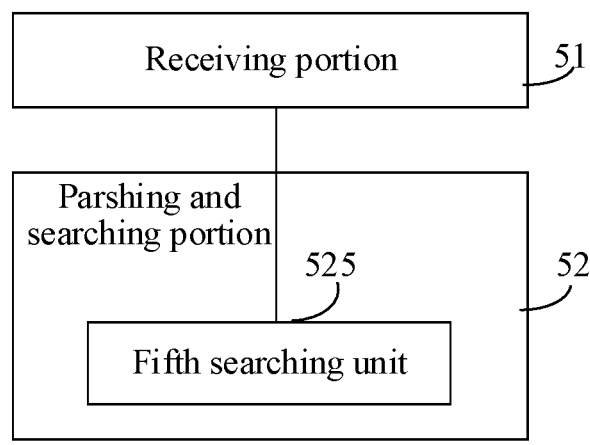
FIG. 7 is a block diagram of another device for searching a CORESET of RMSI, according to some embodiments of the present disclosure.

FIG. 7 is a block diagram of another device for searching a CORESET of RMSI, according to some embodiments of the present disclosure. As shown in FIG. 7, based on the embodiments shown in FIG. 5, in response to the indication information including the third indication information, the parsing and searching portion 52 may include a fifth searching unit 525.

The fifth searching unit 525 is configured to search for the CORESET of the RMSI according to a time-domain scheduling unit indicated by the third indication information.

According to the embodiments, the CORESET of the RMSI is searched for according to the time-domain scheduling unit indicated by the third indication information, so that the searching efficiency is high.

Figure 8:
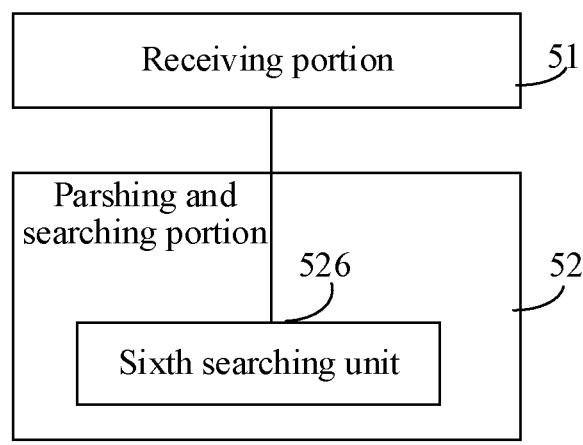
FIG. 8 is a block diagram of another device for searching a CORESET of RMSI, according to some embodiments of the present disclosure.

FIG. 8 is a block diagram of another device for searching a CORESET of RMSI, according to some embodiments of the present disclosure. As shown in FIG. 8, based on the embodiments shown in FIG. 5, in response to the indication information including the fourth indication information, the parsing and searching portion 52 may include a sixth searching unit 526.

The sixth searching unit 526 is configured to search a corresponding detection window for the CORESET of the RMSI according to the fourth indication information.

According to the embodiments, the corresponding detection window is searched for the CORESET of the RMSI according to the fourth indication information, so that the searching efficiency is high.

Figure 9:
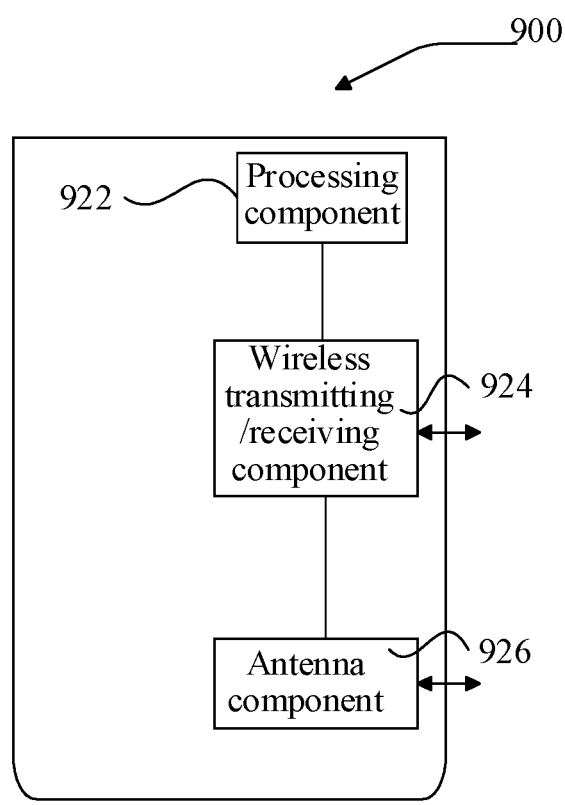
FIG. 9 is a block diagram of a device for indicating time-domain information of a CORESET of RMSI, according to some embodiments of the present disclosure.

FIG. 9 is a block diagram of another device for indicating time-domain information of a CORESET of RMSI, according to some embodiments of the present disclosure. The device 900 may be provided as a base station. Referring to FIG. 9, the device 900 includes a processing component 922, a wireless transmission/receiving component 924, an antenna component 926 and a wireless interface-specific signal processing part, and the processing component 922 may further include one or more processors.

One processor in the processing component 922 may be configured to:

add indication information into a PBCH of an SSB, the indication information including at least one of both first indication information and second indication information, third indication information, or fourth indication information, the first indication information being configured to indicate a time sequence of a CORESET of RMSI corresponding to the SSB and the SSB, the second indication information being configured to indicate time offset information of the CORESET of the RMSI relative to the SSB in each cycle, the time offset information being equal to time offset information of the CORESET of the RMSI relative to an SSB mapped into a half frame where the CORESET of the RMSI is located if the CORESET of the RMSI and the SSB are within different half frames of the same cycle, the third indication information being configured to indicate a scheduling manner for the CORESET of the RMSI and the fourth indication information being configured to indicate a size of a detection window for the CORESET of the RMSI; and send the SSB carrying the indication information to a UE in a manner of beam sweeping.

In some embodiments of the present disclosure, there is also provided a non-transitory computer-readable storage medium including instructions, and the instructions may be executed by the processing component 922 of the device 900 to implement the method for indicating the time-domain information of the CORESET of the RMSI. For example, the non-transitory computer-readable storage medium may be a read-only memory (ROM), a compact disc read-only memory (CD-ROM), a magnetic tape, a floppy disc, an optical data storage device and the like.

Figure 10:
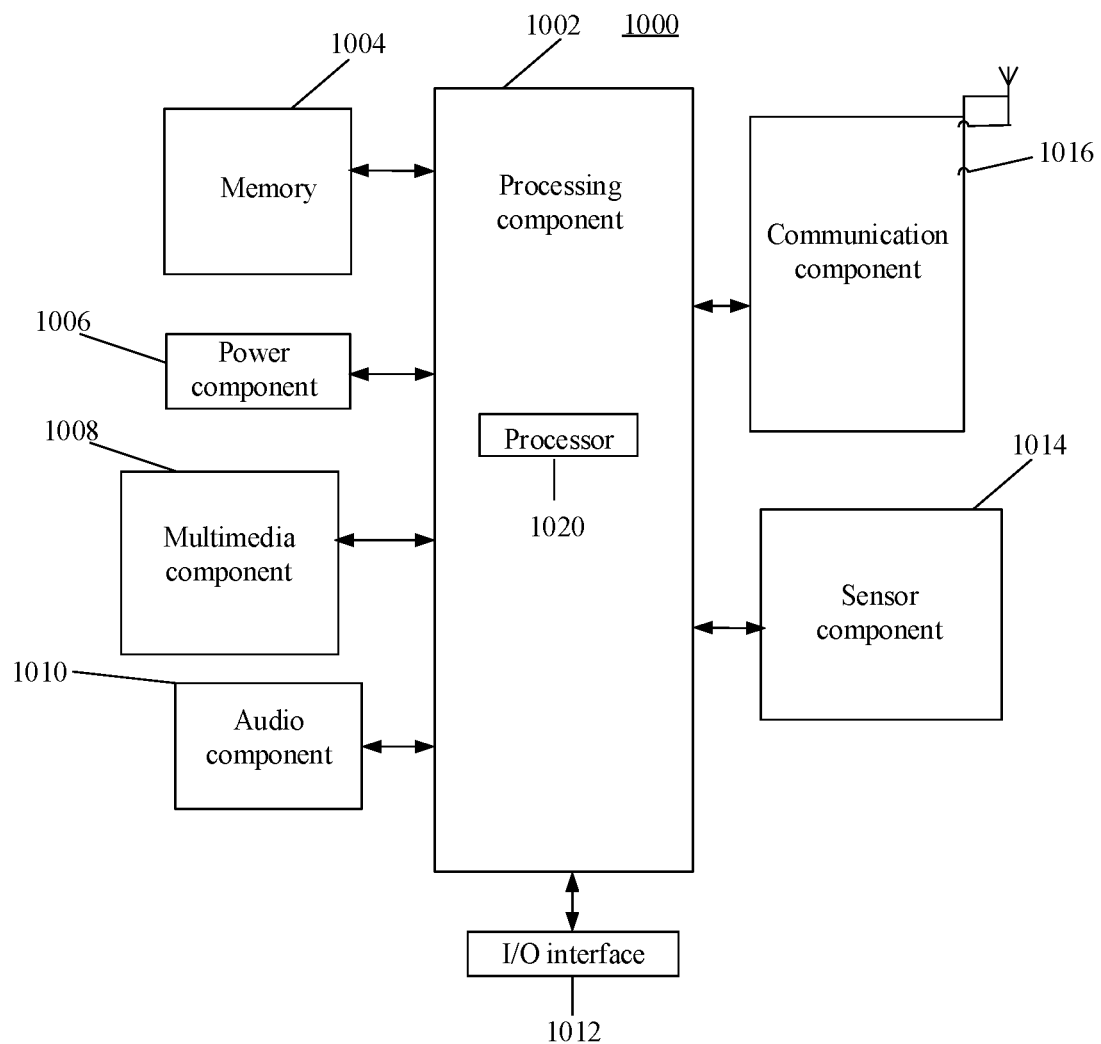
FIG. 10 is a block diagram of a device for searching a CORESET of RMSI, according to some embodiments of the present disclosure.

FIG. 10 is a block diagram of a device for searching a CORESET of RMSI, according to some embodiments of the present disclosure. For example, the device 1000 may be a UE such as a mobile phone, a computer, a digital broadcast terminal, a messaging device, a gaming console, a tablet, a medical device, exercise equipment and a personal digital assistant.

Referring to FIG. 10, the device 1000 may include one or more of the following components: a processing component 1002, a memory device 1004, a power component 1006, a multimedia component 1008, an audio component 1010, an Input/Output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the blocks in the abovementioned method. Moreover, the processing component 1002 may include one or more modules which facilitate interaction between the processing component 1002 and the other components. For instance, the processing component 1002 may include a multimedia module to facilitate interaction between the multimedia component 1008 and the processing component 1002.

One processor 1020 in the processing component 1002 may be configured to:

receive an SSB carrying indication information from a base station, the indication information including at least one of both first indication information and second indication information, third indication information, or fourth indication information, the first indication information being configured to indicate a time sequence of a CORESET of RMSI corresponding to the SSB and the SSB, the second indication information being configured to indicate time offset information of the CORESET of the RMSI relative to the SSB in each cycle, the time offset information being equal to time offset information of the CORESET of the RMSI relative to an SSB mapped into a half frame where the CORESET of the RMSI is located if the CORESET of the RMSI and the SSB are within different half frames of the same cycle, the third indication information being configured to indicate a scheduling manner for the CORESET of the RMSI and the fourth indication information being configured to indicate a size of a detection window for the CORESET of the RMSI; and parse out the indication information from the SSB and search a corresponding time-domain for the CORESET of the RMSI according to the indication information.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented by any type of volatile or non-volatile memory devices, or a combination thereof, such as an electrically erasable programmable read-only memory (EEPROM), an erasable programmable read-only memory (EPROM), a programmable read-only memory (PROM), a ROM, a magnetic memory, a flash memory, and a magnetic or optical disk.

The power component 1006 provides power for various components of the device 1000. The power component 1006 may include a power management system, one or more power supplies, and other components associated with generation, management and distribution of power for the device 1000.

The multimedia component 1008 includes a screen providing an output interface between the device 1000 and a user. In some embodiments, the screen may include a liquid crystal display (LCD) and a touch panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1008 includes a front camera and/or a rear camera. The front camera and/or the rear camera may receive external multimedia data in response to the device 1000 being in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a microphone (MIC), and the MIC is configured to receive an external audio signal in response to the device 1000 being in the operation mode, such as a call mode, a recording mode and a voice recognition mode. The received audio signal may further be stored in the memory 1004 or sent through the communication component 1016. In some embodiments, the audio component 1010 further includes a speaker configured to output the audio signal.

The I/O interface 1012 provides an interface between the processing component 1002 and a peripheral interface module, and the peripheral interface module may be a keyboard, a click wheel, a button and the like. The button may include, but not limited to: a home button, a volume button, a starting button and a locking button.

The sensor component 1014 includes one or more sensors configured to provide status assessment in various aspects for the device 1000. For instance, the sensor component 1014 can detect an on/off status of the device 1000 and relative positioning of components, such as a display and small keyboard of the device 1000, and the sensor component 1014 can further detect a change in a position of the device 1000 or a component of the device 1000, presence or absence of contact between the user and the device 1000, orientation or acceleration/deceleration of the device 1000 and a change in temperature of the device 1000. The sensor component 1014 may include a proximity sensor configured to detect presence of an object nearby without any physical contact. The sensor component 1014 may also include a light sensor, such as a complementary metal oxide semiconductor (CMOS) or charge coupled device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and another device. The device 1000 may access a communication-standard-based wireless network, such as a wireless fidelity (Wi-Fi) network, a 2nd-generation (2G), 3rd-generation (3G), $4^{th}$-generation (4G), or $5^{th}$-generation (5G) network or a combination thereof. In some embodiments of the present disclosure, the communication component 1016 receives a broadcast signal or broadcast associated information from an external broadcast management system through a broadcast channel. In some embodiments of the present disclosure, the communication component 1016 further includes a near field communication (NFC) module to facilitate short-range communication. For example, the NFC module may be implemented based on a radio frequency identification (RFID) technology, an infrared data association (IrDA) technology, an ultra-wide band (UWB) technology, a Bluetooth (BT) technology and another technology.

In some embodiments of the disclosure, the device 1000 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In some embodiments of the disclosure, there is also provided a non-transitory computer-readable storage medium including instructions, such as the memory 1004 including instructions, and the instructions may be executed by the processor 1020 of the device 1000 to implement the abovementioned method. For example, the non-transitory computer-readable storage medium may be a ROM, a CD-ROM, a magnetic tape, a floppy disc, an optical data storage device and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

Various embodiments of the present disclosure can have one or more of the following advantages.

The indication information is added into the PBCH of the SSB, the indication information including at least one of both the first indication information and the second indication information; the third indication information or the fourth indication information. In response to the CORESET of the RMSI and the SSB being within different half frames of the same cycle, the time offset information thereof is the time offset information of the CORESET of the RMSI relative to the SSB mapped into the half frame where the CORESET of the RMSI is located, so that the second indication information can be indicated with as few bits as possible, and at most 1 bit is used for other indication information. Therefore, the time-domain information of the CORESET of the RMSI can be indicated with as few bits as possible.

The SSB carrying the indication information is received from the base station, and the corresponding time-domain is searched for the CORESET of the RMSI according to the indication information parsed out from the SSB. In the whole implementation process, few bits are occupied by the time-domain information of the CORESET of the RMSI, and searching efficiency of the CORESET of the RMSI is improved.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for indicating time-domain information of a common control resource set (CORESET) of remaining minimum system information (RMSI), for applying to a base station, comprising:
adding indication information into a physical broadcast channel (PBCH) of a first synchronization signal block (SSB);
wherein the indication information comprises at least one of the following:
both first indication information and second indication information;
third indication information; or
fourth indication information,
wherein the first indication information indicates a time sequence between a CORESET of RMSI corresponding to the first SSB and the first SSB, and the second indication information indicates time offset information of the CORESET of the RMSI relative to the first SSB in each cycle, the time sequence between the CORESET of the RMSI corresponding to the first SSB and the first SSB includes that the CORESET of the RMSI is either before the first SSB or after the first SSB;
wherein in response to the CORESET of the RMSI and the first SSB are within different half frames of a same cycle, the time offset information is time offset information of the CORESET of the RMSI relative to a second SSB mapped into a half frame where the CORESET of the RMSI is located and corresponding to the first SSB;
wherein the third indication information indicates a scheduling manner for the CORESET of the RMSI, and the fourth indication information indicates a size of a detection window for the CORESET of the RMSI, and wherein the first indication information is indicated with 1 bit, bits for the second information are not exceeding 2 bits, the third indication information is indicated with 1 bit, and under a condition that there are remaining bits in bits configured to represent the indication information, the indication information includes the fourth indication information; and
sending the first SSB carrying the indication information to a user equipment (UE) in a manner of beam sweeping.

2. The method of claim 1, wherein, in response to the CORESET of the RMSI and the first SSB being within a same half frame and the CORESET of the RMSI being after the first SSB in time, the time offset information of the CORESET of the RMSI relative to the first SSB is calculated from a slot in the half frame immediately after the slot where the first SSB is located;

in response to the CORESET of the RMSI and the first SSB being within different half frames of a same cycle and the CORESET of the RMSI being after the first SSB in time, the time offset information of the CORESET of the RMSI relative to the second SSB mapped into a half frame where the CORESET of the RMSI is located and corresponding to the first SSB is calculated from a slot immediately after the slot where the second SSB mapped into the half frame where the CORESET of the RMSI is located and corresponding to the first SSB is located;

in response to the CORESET of the RMSI and the first SSB being within a same half frame and the CORESET of the RMSI being before the first SSB in time, the time offset information of the CORESET of the RMSI relative to the first SSB is calculated from a slot in the half frame immediately before the slot where the first SSB is located; or in response to the CORESET of the RMSI and the first SSB being within different half frames of a same cycle and the CORESET of the RMSI being before the first SSB in time, the time offset information of the CORESET of the RMSI relative to the second SSB mapped into the half frame where the CORESET of the RMSI is located and corresponding to the first SSB is calculated from a slot immediately before the slot where the second SSB a mapped into the half frame where the CORESET of the RMSI is located and corresponding to the first SSB is located.

3. The method of claim 1, wherein the scheduling manner for the CORESET of the RMSI comprises slot-based scheduling and non-slot-based scheduling.

4. A method for searching time-domain information of a common control resource set (CORESET) of remaining minimum system information (RMSI), for applying to a user equipment (UE), comprising:
receiving a first synchronization signal block (SSB) carrying indication information sent by a base station;
wherein the indication information comprises at least one of:
both first indication information and second indication information;
third indication information; or
fourth indication information,
wherein the first indication information indicates a time sequence between a CORESET of RMSI corresponding to the first SSB and the first SSB, and the second indication information indicates time offset information of the CORESET of the RMSI relative to the first SSB in each cycle, the time sequence between the CORESET of the RMSI corresponding to the first SSB and the first SSB includes that the CORESET of the RMSI is either before the first SSB or after the first SSB;
wherein in response to the CORESET of the RMSI and the first SSB are within different half frames of a same cycle, the time offset information is time offset information of the CORESET of the RMSI relative to a second SSB mapped into a half frame where the CORESET of the RMSI is located and corresponding to the first SSB;
wherein the third indication information indicates a scheduling manner for the CORESET of the RMSI, and the fourth indication information indicates a size of a detection window for the CORESET of the RMSI, and wherein the first indication information is indicated with 1 bit, bits for the second information are not exceeding 2 bits, the third indication information is indicated with 1 bit, and under a condition that there are remaining bits in bits configured to represent the indication information, the indication information includes the fourth indication information; and
parsing out the indication information from the first SSB, and searching, according to the indication information, a corresponding time-domain for the CORESET of the RMSI.

5. The method of claim 4, wherein, in response to the indication information comprising both the first indication information and the second indication information, searching, according to the indication information, the corresponding time-domain for the CORESET of the RMSI comprises:
in response to the CORESET of the RMSI and the first SSB to be received being within a same half frame and the CORESET of the RMSI being after the first SSB in time, searching the CORESET of the RMSI in a slot which number corresponding to the time offset information after a next slot, taken as a starting point, of a slot where the first SSB is located in a corresponding half frame;
in response to the CORESET of the RMSI and the first SB to be received being within a same half frame and the CORESET of the RMSI being before the SSB in time, searching the CORESET of the RMSI in a slot which number corresponding to the time offset information before a previous slot, taken as the starting point, of the slot where the first SSB is located in the corresponding half frame;
in response to the CORESET of the RMSI and the first SSB to be received being within different half frames and the CORESET of the RMSI being after the first SSB in time, searching the CORESET of the RMSI in a slot which number corresponding to the time offset information after a next slot, taken as the starting point, of a slot where the second SSB mapped into a half frame where the CORESET of the RMSI is located and corresponding to the first SSB is located; or
in response to the CORESET of the RMSI and the first SSB to be received being within different half frames and the CORESET of the RMSI being before the first SSB in time, searching the CORESET of the RMSI in a slot which number corresponding to the time offset information before a previous slot, taken as the starting point, of the slot where the second SSB mapped into the half frame where the CORESET of the RMSI is located and corresponding to the first SSB is located.

6. The method of claim 4, wherein in response to the indication information comprising the third indication information, and the searching, according to the indication information, the corresponding time-domain for the CORESET of the RMSI comprises:
searching for the CORESET of the RMSI, according to a time-domain scheduling unit indicated by the third indication information.

7. The method of claim 4, wherein in response to the indication information comprising the fourth indication information, and the searching, according to the indication information, the corresponding time-domain for the CORESET of the RMSI comprises:
searching, according to the fourth indication information, a corresponding detection window, for the CORESET of the RMSI.

8. A base station, comprising:
a processor; and
a memory device configured to store instructions executable by the processor,
wherein the processor is configured to:
add indication information into a physical broadcast channel (PBCH) of a first synchronization signal block (SSB);
wherein the indication information comprises at least one of:
both first indication information and second indication information;
third indication information; or
fourth indication information,
wherein the first indication information indicates a time sequence between a Control Resource Set (CORESET) of remaining minimum system information (RMSI) corresponding to the first SSB and the first SSB, and the second indication information indicates time offset information of the CORESET of the RMSI relative to the first SSB in each cycle, the time sequence between the CORESET of the RMSI corresponding to the first SSB and the first SSB includes that the CORESET of the RMSI is either before the first SSB or after the first SSB;
wherein in response to the CORESET of the RMSI and the first SSB are within different half frames of a same cycle, the time offset information is time offset information of the CORESET of the RMSI relative to a second SSB mapped into a half frame where the CORESET of the RMSI is located and corresponding to the first SSB;

wherein the third indication information indicates a scheduling manner for the CORESET of the RMSI, and the fourth indication information indicates a size of a detection window for the CORESET of the RMSI, and wherein the first indication information is indicated with 1 bit, bits for the second information are not exceeding 2 bits, the third indication information is indicated with 1 bit, and under a condition that there are remaining bits in bits configured to represent the indication information, the indication information includes the fourth indication information; and send the first SSB carrying the indication information to a user equipment (UE) in a manner of beam sweeping.

9. The base station of claim 8, wherein, in response to the CORESET of the RMSI and first SSB being within a same half frame and the CORESET of the RMSI being after the first SSB in time, the time offset information of the CORESET of the RMSI relative to the first SSB is calculated from a slot in the half frame immediately after the slot where the first SSB is located;

in response to the CORESET of the RMSI and the first SSB being within different half frames of a same cycle and the CORESET of the RMSI being after the first SSB in time, the time offset information of the CORESET of the RMSI relative to the second SSB mapped into a half frame where the CORESET of the RMSI and corresponding to the first SSB is located is calculated from a slot immediately after the slot where the second SSB mapped into the half frame where the the CORESET of the RMSI is located and corresponding to the first SSB is located;

in response to the CORESET of the RMSI and the first SSB being within a same half frame and the CORESET of the RMSI being before the first SSB in time, the time offset information of the CORESET of the RMSI relative to the first SSB is calculated from a slot in the half frame immediately before the slot where the first SSB is located; or in response to the CORESET of the RMSI and the first SSB being within different half frames of a same cycle and the CORESET of the RMSI being before the first SSB in time, the time offset information of the CORESET of the RMSI relative to the second SSB mapped into the half frame where the CORESET of the RMSI is located and corresponding to the first SSB is calculated from a slot immediately before the slot where the second SSB mapped into the half frame where the CORESET of the RMSI is located and corresponding to the first SSB is located.

10. The base station of claim 8, wherein the scheduling manner for the CORESET of the RMSI comprises slot-based scheduling and non-slot-based scheduling.

11. User Equipment (UE), comprising:
a processor; and
a memory device configured to store instructions executable by the processor,
wherein the processor is configured to:
receive a first Synchronization Signal Block (SSB) carrying indication information sent by a base station;
wherein the indication information comprises at least one of:
both first indication information and second indication information;

third indication information; or
fourth indication information,
wherein the first indication information indicates a time sequence between a control resource set (CORESET) of remaining minimum system information (RMSI) corresponding to the first SSB and the first SSB, and the second indication information indicates time offset information of the CORESET of the RMSI relative to the first SSB in each cycle, the time sequence between the CORESET of the RMSI corresponding to the first SSB and the first SSB includes that the CORESET of the RMSI is either before the first SSB or after the first SSB;

wherein in response to the CORESET of the RMSI and the first SSB are within different half frames of a same cycle, the time offset information is time offset information of the CORESET of the RMSI relative to a second SSB mapped into a half frame where the CORESET of the RMSI is located and corresponding to the first SSB;

wherein the third indication information indicates a scheduling manner for the CORESET of the RMSI and the fourth indication information indicates a size of a detection window for the CORESET of the RMSI, and wherein the first indication information is indicated with 1 bit, bits for the second information are not exceeding 2 bits, the third indication information is indicated with 1 bit, and under a condition that there are remaining bits in bits configured to represent the indication information, the indication information includes the fourth indication information; and parse out the indication information from the first SSB, and search, according to the indication information, a corresponding time-domain for the CORESET of the RMSI.

12. The UE of claim 11, wherein, in response to the indication information comprising both the first indication information and the second indication information, the processor is further configured to:

in response to the CORESET of the RMSI and the first SSB to be received being within a same half frame and the CORESET of the RMSI being after the first SSB in time, search the CORESET of the RMSI in a slot which number corresponding to the time offset information after a next slot, taken as a starting point, of a slot where the first SSB is located in a corresponding half frame;

in response to the CORESET of the RMSI and the first SSB to be received being within a same half frame and the CORESET of the RMSI being before the first SSB in time, search the CORESET of the RMSI in a slot which number corresponding to the time offset information before a previous slot, taken as the starting point, of the slot where the first SSB is located in the corresponding half frame;

in response to the CORESET of the RMSI and the first SSB to be received being within different half frames and the CORESET of the RMSI being after the first SSB in time, search the CORESET of the RMSI in a slot which number corresponding to the time offset information after a next slot, taken as the starting point, of a slot where the the second SSB mapped into a half frame where the CORESET of the RMSI is located and corresponding to the first SSB is located; or in response to the CORESET of the RMSI and the first SSB to be received being within different half frames and the CORESET of the RMSI being before the first SSB in time, search the CORESET of the RMSI in a slot which number corresponding to the time offset information before a previous slot, taken as the starting point, of the slot where the second SSB mapped into the half frame where the CORESET of the RMSI is located and corresponding to the first SSB is located.

13. The UE of claim 11, wherein, in response to the indication information comprising the third indication information, the processor is further configured to:
search for the CORESET of the RMSI, according to a time-domain scheduling unit indicated by the third indication information.

14. The UE of claim 11, wherein in response to the indication information comprising the fourth indication information, the processor is further configured to:
search, according to the fourth indication information, a corresponding detection window, for the CORESET of the RMSI.

15. A communication system implementing the method of claim 1, comprising the base station, wherein in response to the CORESET of the RMSI and the first SSB being within different half frames of the same cycle, the time offset information thereof is the time offset information of the CORESET of the RMSI relative to the second SSB mapped into the half frame where the CORESET of the RMSI is located and corresponding to the first SSB, such that the second indication information is indicated with minimized bits, and a maximum of 1 bit is used for other indication information, thereby minimizing bits for indicating the time-domain information of the CORESET of the RMSI.

16. The communication system of claim 15, further comprising the UE, wherein the UE is configured to:
receive the first SSB carrying the indication information from the base station;
parse out the indication information from the first SSB; and
search the corresponding time-domain for the CORESET of the RMSI according to the indication information parsed out from the first SSB, thereby reducing bits occupied by the time-domain information of the CORESET of the RMSI, and improving search efficiency of the CORESET of the RMSI.

* * * * *